(12) United States Patent
Huber et al.

(10) Patent No.: US 7,330,018 B2
(45) Date of Patent: Feb. 12, 2008

(54) STEP-DOWN CONTROLLER CIRCUIT

(75) Inventors: Andreas Huber, Maisach (DE); Peter Niedermeier, Munich (DE); Bernhard Reiter, Munich (DE)

(73) Assignee: Patent-Treuhand-Gesellschaft fuer Gluehlampen mbH, Munich (DE)

( * ) Notice: Subject to any disclaimer, the term of this patent is extended or adjusted under 35 U.S.C. 154(b) by 265 days.

(21) Appl. No.: 11/242,858

(22) Filed: Oct. 5, 2005

(65) Prior Publication Data

US 2006/0076942 A1   Apr. 13, 2006

(30) Foreign Application Priority Data

Oct. 13, 2004   (DE) ............... 10 2004 050 060

(51) Int. Cl.
G05F 1/00 (2006.01)
G05F 1/571 (2006.01)
G05F 1/573 (2006.01)

(52) U.S. Cl. ............... 323/282; 323/220; 323/276; 323/284; 323/222; 363/62

(58) Field of Classification Search ........... 323/220, 323/222, 276, 282, 284; 363/62
See application file for complete search history.

(56) References Cited

U.S. PATENT DOCUMENTS

| | | | | |
|---|---|---|---|---|
| 4,734,636 A | * | 3/1988 | Stevens | 323/235 |
| 4,760,324 A | * | 7/1988 | Underhill | 323/282 |
| 4,857,822 A | * | 8/1989 | Tabisz et al. | 323/282 |
| 5,262,930 A | * | 11/1993 | Hua et al. | 363/21.03 |
| 5,815,386 A | * | 9/1998 | Gordon | 363/50 |
| 5,923,153 A | * | 7/1999 | Liu | 323/222 |
| 5,923,547 A | * | 7/1999 | Mao | 363/52 |
| 6,051,961 A | * | 4/2000 | Jang et al. | 323/224 |
| 6,259,235 B1 | * | 7/2001 | Fraidlin et al. | 323/222 |
| 6,525,513 B1 | * | 2/2003 | Zhao | 323/222 |
| 6,580,259 B2 | * | 6/2003 | Liu et al. | 323/282 |
| 6,710,582 B2 | * | 3/2004 | Watanabe | 323/222 |

* cited by examiner

Primary Examiner—Bao Q. Vu
Assistant Examiner—Jue Zhang
(74) Attorney, Agent, or Firm—Carlo Bessone

(57) ABSTRACT

A step-down controller has an input having a first and a second input terminal for applying an input voltage, an output having a first and a second output terminal at which an output voltage can be provided, a series circuit including a switch and an inductance which is coupled between the first input terminal and the first output terminal. The switch has a control input for applying a control signal. A first diode is coupled between a junction point between the switch and the inductance and a reference potential such that, when the inductance is freewheeling, a current flow through the first diode ($D_1$) is possible. There is a snubber network with a snubber capacitor, a second and third diode and an auxiliary inductance, a series circuit including the snubber capacitor, the third diode and the auxiliary inductance being coupled in parallel with the inductance.

8 Claims, 2 Drawing Sheets

STEP-DOWN CONTROLLER CIRCUIT

FIELD OF THE INVENTION

The present invention relates to a step-down controller circuit, in particular to a step-down controller circuit having an input having a first and a second input terminal for the purpose of applying an input voltage, an output having a first and a second output terminal at which an output voltage can be provided, a series circuit comprising a switch and an inductance which is coupled between the first input terminal and the first output terminal, the switch having a control input for the purpose of applying a control signal, and a first diode which is coupled between the junction point between the switch and the inductance and a reference potential such that, when the inductance is freewheeling, a current flow through the first diode is possible.

BACKGROUND OF THE INVENTION

Such a circuit known from the prior art is illustrated in FIG. 1, in which the input voltage is given the reference $U_e$, the output voltage the reference $U_a$, the switch the reference $S_1$, the control input the reference St, the first diode the reference $D_1$ and the inductance the reference $L_T$. In this case, the input voltage $U_e$ is provided by an input capacitor $C_e$. The output voltage $U_a$ can be tapped off at an output capacitor $C_a$. A shunt resistor $R_{she}$ is used for current measurement purposes.

The problem on which the invention is based will be described in the text which follows with reference to the step-down controller circuit illustrated in FIG. 1: once the switch $S_1$ has been closed, current flows in the circuit $S_1$, $L_T$, $C_a$, $R_{she}$, $C_e$. Owing to this current flow, the inductance $L_T$ is magnetized and the output capacitor $C_a$ is charged. If the switch $S_1$ is then opened, the inductance $L_T$ attempts to maintain the current flow and drives a current in the circuit $L_T$, $C_a$, $R_{she}$, $D_1$. Owing to parasitic line inductances in the diode path of the diode $D_1$ which are combined here in the inductance $L_{par}$, initially current flow is prevented via the diode path of the diode $D_1$, however. The voltage $U_{Dr.}$ present across the diode $D_1$ increases, which becomes apparent in undesirable voltage peaks and in the consequence of these voltage peaks in terms of electromagnetic interference (EMIR). With this known step-down controller circuit, this is counteracted by a trapezoidal capacitor $C_{Tri}$ being provided which takes over the initial current flow when the switch $S_1$ is turned off. Although at some point the trapezoidal capacitor $C_{Tri}$ is then charged, in the meantime the parasitic inductance $L_{par}$ is magnetized such that the current flow can be taken over by the diode path of the diode $D_1$. A further disadvantage results by virtue of the fact that the switch $S_1$ needs to have very large dimensions as regards its power loss. This results from a limited switching time, i.e. when $S_1$ is turned off, a voltage $U_{St.}$ is present across the switch $S_1$ while, at the same time, a current is flowing through it. The product of these two variables reproduces the power loss converted in the switch $S_1$. As a result of this power loss, the switch $S_1$ needs to be given excess dimensions, i.e. needs to have markedly larger dimensions than would actually be necessary as regards the load to be driven by it at the output terminals, preferably a lamp. Moreover, the energy stored in the trapezoidal capacitor $C_{Tri}$ is not used expediently but is converted into heat in the switch $S_1$. As is obvious to those skilled in the art, charging of the trapezoidal capacitor $C_{Tri}$ directly via the switch $S_1$ is not regarded favorably as a result of the high load on the switch and is therefore likewise undesirable.

SUMMARY OF THE INVENTION

Starting from the generic step-down controller circuit, the present invention is therefore based on the object of providing a step-down controller circuit which is characterized by improved EMIR and by a lower power loss.

The present invention is based on the knowledge that it is possible to improve EMIR by means of a flatter edge of the voltage across the diode $D_1$. It is possible to improve the power loss by delayed charging of a snubber capacitor $C_{cent}$. In order to implement this idea, the generic step-down controller circuit also comprises a snubber network having the above mentioned snubber capacitor $C_{cent}$, a second diode $D_2$, a third diode $D_3$ and an auxiliary inductance $L_H$. In this case, a series circuit comprising the snubber capacitor, the third diode and the auxiliary inductance is coupled in parallel with the inductance. The following embodiments are true for $$Ua \leq \frac{U_e}{2}:$$

When the switch $S_1$ is closed, a current flows in the circuit $C_{cent}$, $D_3$, $L_H$, driven by the voltage difference $U_e-U_a$. Owing to this circuitry, the current rise when the switch $S_1$ is turned on is braked by the inductance $L_H$. As a result of the fact that the second diode is coupled with its first terminal to the reference potential and with its second terminal to the junction point between the snubber capacitor and the third diode, the second diode being polarized, as the first diode, with respect to the reference potential, and the third diode being polarized with respect to the second diode such that a current flow through a series circuit comprising the second diode and the third diode is possible, initially a current flow via $L_T$, $C_a$, $D_2$ and $C_{cent}$ is made possible when the switch $S_1$ is turned off. As soon as $C_{cent}$ has been charged, the current flows via $D_2$, $D_3$, $L_H$. The energy contained in the snubber transistor $C_{cent}$ is thus not converted into power loss in the switch $S_1$ but is used for charging the output circuit.

In a preferred embodiment, a fourth diode is arranged in parallel with the snubber capacitor, the fourth diode being oriented with respect to the second diode such that a current flow through a series circuit comprising the second diode and the fourth diode is possible. Owing to a fourth diode arranged in this way, a pronounced negative undershoot of the voltage across the cathode of the first diode and a peak charge current through the snubber capacitor $C_{cent}$, which can cause faults when detecting the current value and as a result during current regulation, are reduced. The introduction of the fourth diode results in the parasitic inductances $L_{par}$ not being magnetized immediately on commutation since the current flows via the second diode $D_2$, the snubber transistor $C_{cent}$ and the fourth diode $D_4$. This embodiment is therefore characterized by a lower negative undershoot which results in less EMIR. A further advantage of this embodiment consists in it being possible to position the power semiconductors $S_1$ and $D_1$ more freely. Since the parasitic inductances $L_{par}$ do not need to be magnetized quickly, they can assume larger values. It is thus also possible for the feed line to $D_1$ to be longer.

The cause of the lower negative undershoot is as follows: once the switch $S_1$ has been opened, as a result of the parasitic inductances $L_{par}$ in the diode path of the diode $D_1$, initially, for example, for approximately 100 Nos a current is connected via the series circuit comprising the diodes $D_2$ and $D_4$. Subsequently, i.e. if the parasitic inductance $L_{par}$ has been magnetized, the current changes over to the diode path of the diode $D_1$. The reason for this lies in the dimensions of the diodes $D_1$, $D_2$, $D_4$ which are in this case selected such that the on time of the diode $D_1$ is approximately a factor of 10 over the on time of the diodes $D_2$ and $D_4$.

In the embodiments described above, a shunt resistor for the purpose of detecting the current is preferably arranged between the second output terminal and the point at which the second diode is coupled to the reference potential. The shunt resistor $R_{she}$ is required for driving the switch $S_1$ via its control input St. In this case, control takes place using the current, i.e. if the current increases above a specific value, the switch $S_1$ is turned off until the current driven by the inductance $L_T$ has fallen back to zero; the switch $S_1$ is then turned on again.

A further embodiment is characterized by the fact that the current detection now takes place in the load circuit, i.e. the output capacitor has a first and a second terminal, the first terminal being coupled to the first output terminal, and the shunt resistor being arranged between the second terminal of the output capacitor and the second output terminal. Owing to this arrangement, faults in the current detection owing to the charge current peaks during charging of $C_{cent}$ and $L_T$ are prevented. However, this positioning is unfavorable as regards dynamic current regulation.

With such an arrangement of the shunt resistor, the current flow through the switch $S_1$ is not measured without error. In this case, two consequences result: the switch $S_1$ may become faulty if it is turned on for too long. Secondly, it is only possible with great difficulty to respond to changes in the operating parameters of a lamp connected to the output terminals by driving the control input St. of the switch $S_1$ on the basis of a current measurement carried out using a shunt resistor arranged in this way.

A particularly advantageous embodiment is characterized by the fact that it also comprises a filter capacitor $C_F$ and a filter inductance $L_F$, the filter inductance $L_F$ being arranged in series with the auxiliary inductance $L_H$ between the filter inductance $L_F$ and the first output terminal, and the filter capacitor $C_F$ being arranged between the junction point between the auxiliary inductance $L_H$ and the filter inductance $L_F$ and the reference potential. By introducing a filter capacitor $C_F$, the current flow for the purpose of charging the snubber capacitor $C_{cent}$ via the shunt resistor $R_{she}$ is prevented. The current flows via the filter capacitor $C_F$ and thus past the shunt resistor $R_{she}$. The energy stored in the filter capacitor $C_F$ is fed into the load circuit as a low direct current via the filter inductance $L_F$. Alternatively, the energy stored in the filter capacitor can be supplied via an additional circuit, in particular via a series regulator, to a control circuit which provides the control signal for the switch $S_1$.

Further advantageous embodiments are described in the sub claims.

BRIEF DESCRIPTION OF THE DRAWINGS

Exemplary embodiments of the invention will now be described in more detail below with reference to the attached drawings, in which.

DETAILED DESCRIPTION OF THE INVENTION

Figure 1:
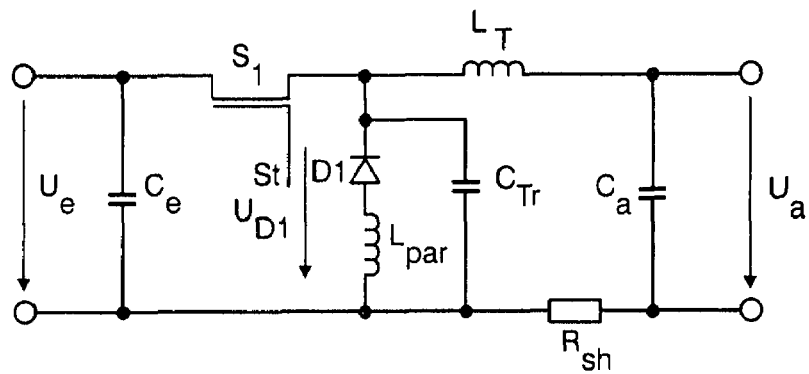
FIG. 1 shows a step-down controller circuit known from the prior art.

Components which have already been introduced and explained in connection with the illustration of the prior art shown in FIG. 1 will not be described again below.

Figure 2:
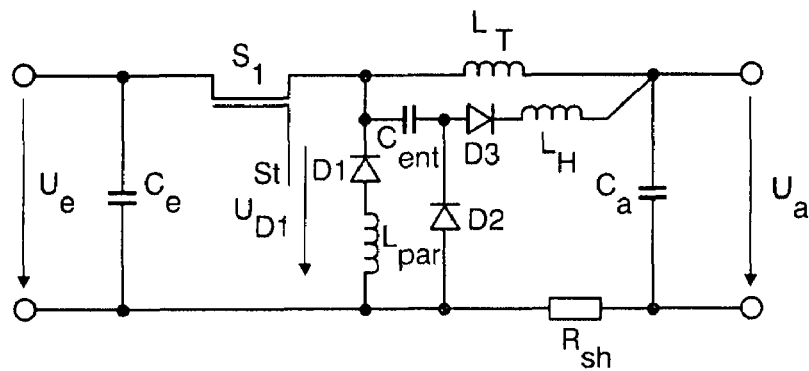
FIG. 2 shows a first exemplary embodiment of a step-down controller circuit according to the invention.

In the exemplary embodiment illustrated in FIG. 2 of a step-down controller circuit according to the invention, a snubber network is provided which comprises a snubber capacitor $C_{cent}$, a second diode $D_2$, a third diode $D_3$ and an auxiliary inductance $L_H$. A series circuit comprising the snubber capacitor $C_{cent}$, the third diode $D_3$ and the auxiliary inductance $L_H$ is coupled in parallel with the inductance $L_T$. The second diode $D_2$ is coupled with its first terminal to the reference potential and with its second terminal to the junction point between the snubber capacitor $C_{cent}$ and the third diode $D_3$, the second diode $D_2$ being polarized, as the first diode $D_1$, with respect to the reference potential, and the third diode $D_3$ being polarized with respect to the second diode $D_2$ such that a current flow through a series circuit comprising the second diode $D_2$ and the third diode $D_3$ is possible.

Reference is made to the fact that in this case the output voltage $U_a$ is less than or equal in value to half the input voltage $U_e$.

Figure 3:
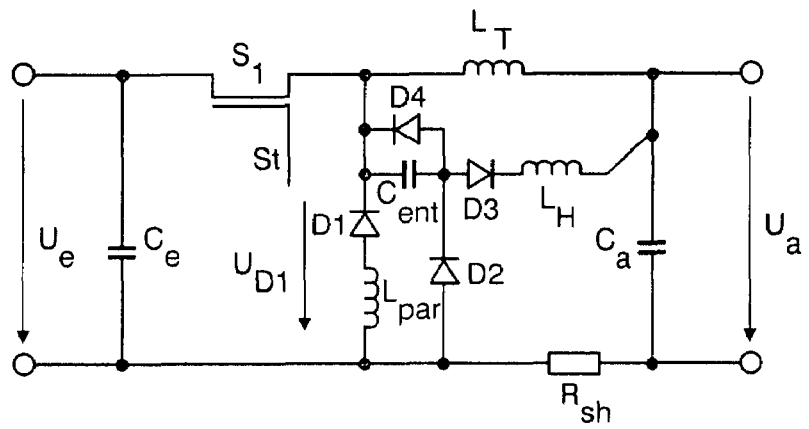
FIG. 3 shows a second exemplary embodiment of a step-down controller circuit according to the invention.
Figure 4:
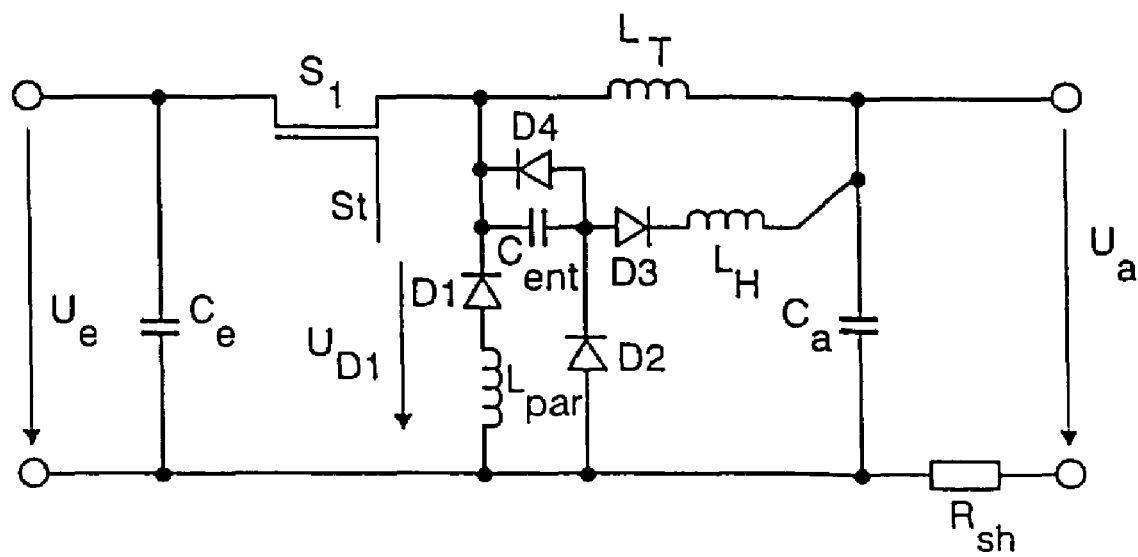
FIG. 4 shows a third exemplary embodiment of a step-down controller circuit according to the invention.

In the exemplary embodiment illustrated in FIG. 3, a fourth diode $D_4$ is arranged in parallel with the snubber capacitor $C_{cent}$, the fourth diode $D_4$ being oriented with respect to the second diode $D_2$ such that a current flow through a series circuit comprising the second diode $D_2$ and the fourth diode $D_4$ is possible. While in the embodiment illustrated in FIG. 3 the shunt resistor $R_{she}$ which is used for current regulation purposes is arranged between the second output terminal and the point at which the second diode $D_2$ is coupled to the reference potential, in the embodiment illustrated in FIG. 4, which otherwise corresponds to the embodiment illustrated in FIG. 3, it is arranged on the load-circuit side, i.e. the output capacitor $C_a$ has a first and a second terminal, the first terminal being coupled to the first output terminal, and the shunt resistor $R_{she}$ being arranged between the second terminal of the output capacitor $C_a$ and the second output terminal of the step-down controller circuit.

Figure 5:
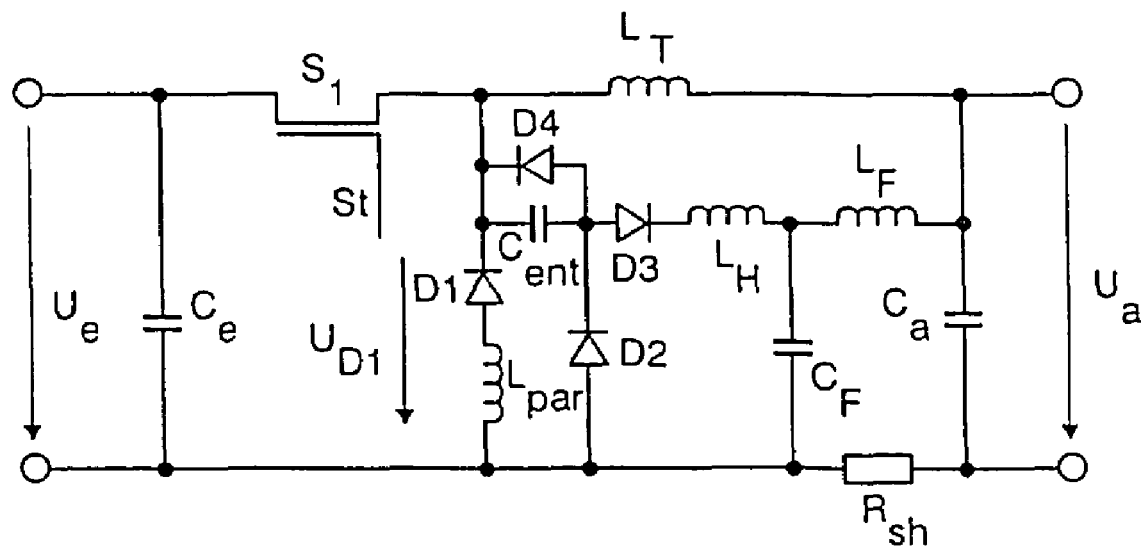
FIG. 5 shows a fourth exemplary embodiment of a step-down controller circuit according to the invention.

In the embodiment illustrated in FIG. 5, a filter capacitor $C_F$ and a filter inductance $L_F$ are also provided, the filter inductance $L_F$ being arranged in series with the auxiliary inductance $L_H$ between the auxiliary inductance $L_H$ and the first output terminal, and the filter capacitor $C_F$ being arranged between the junction point between the auxiliary inductance $L_H$ and the filter inductance $L_F$ and the reference potential.

The invention claimed is:

1. A step-down controller circuit having
   an input having a first and a second input terminal for the purpose of applying an input voltage ($U_e$);
   an output having a first and a second output terminal at which an output voltage ($U_a$) can be provided;
   a series circuit comprising a switch ($S_1$) and an inductance ($L_T$) which is coupled between the first input terminal and the first output terminal, the switch ($S_I$) having a control input (St) for the purpose of applying a control signal;

a first diode ($D_1$) which is coupled between the junction point between the switch ($S_I$) and the inductance ($L_T$) and a reference potential such that, when the inductance ($L_T$) is freewheeling, a current flow through the first diode ($D_1$) is possible;

characterized in that it also comprises a snubber network which comprises a snubber capacitor ($C_{ent}$), a second diode ($D_2$), a third diode ($D_3$) and an auxiliary inductance ($L_H$), a series circuit comprising the snubber capacitor ($C_{ent}$), the third diode ($D_3$) and the auxiliary inductance ($L_H$) being coupled in parallel with the inductance ($L_T$), and the second diode ($D_2$) being coupled with its first terminal to the reference potential and with its second terminal to the junction point between the snubber capacitor ($C_{ent}$) and the third diode ($D_3$), the second diode ($D_2$) being polarized, as the first diode ($D_1$), with respect to the reference potential, and the third diode ($D_3$) being polarized with respect to the second diode ($D_2$) such that a current flow through a series circuit comprising the second diode ($D_2$) and the third diode ($D_3$) is possible.

2. The step-down controller circuit as claimed in claim 1, characterized in that an input capacitor ($C_e$) is arranged between the first and the second input terminal.

3. The step-down controller circuit as claimed in claim 1, characterized in that an output capacitor ($C_a$) is arranged between the first and the second output terminal.

4. The step-down controller circuit as claimed in claim 3, characterized in that the output capacitor ($C_a$) has a first and a second terminal, the first terminal being coupled to the first output terminal, and a shunt resistor ($R_{sh}$) being arranged between the second terminal of the output capacitor ($C_a$) and the second output terminal.

5. The step-down controller circuit as claimed in claim 3, characterized in that a shunt resistor ($R_{sh}$) is arranged between the second output terminal and the point at which the second diode ($D_2$) is coupled to the reference potential.

6. The step-down controller circuit as claimed in claim 1, characterized in that a fourth diode ($D_4$) is arranged in parallel with the snubber capacitor ($C_{ent}$), the fourth diode ($D_4$) being oriented with respect to the second diode ($D_2$) such that a current flow through a series circuit comprising the second diode ($D_2$) and the fourth diode ($D_4$) is possible.

7. The step-down controller circuit as claimed in claim 1, characterized in that it also comprises a filter capacitor ($C_F$) and a filter inductance ($L_F$), the filter inductance ($L_F$) being arranged in series with the auxiliary inductance ($L_H$) between the auxiliary inductance ($L_H$) and the first output terminal, and the filter capacitor ($C_F$) being arranged between the junction point between the auxiliary inductance ($L_H$) and the filter inductance ($L_F$) and the reference potential.

8. The step-down controller circuit as claimed in claim 1, characterized in that the output voltage ($U_a$) is less than or equal in value to half the input voltage ($U_e$).

* * * * *